United States Patent [19]

Acampora, Jr.

[11] Patent Number: 5,645,358

[45] Date of Patent: Jul. 8, 1997

[54] ANTIFRICTION BEARING WITH A SEAL LOCKED AGAINST ROTATION

[75] Inventor: Salvatore Acampora, Jr., Bristol, Conn.

[73] Assignee: The Torrington Company, Torrington, Conn.

[21] Appl. No.: 739,776

[22] Filed: Oct. 30, 1996

[51] Int. Cl.$^6$ .................. F16C 33/78; F16C 15/32
[52] U.S. Cl. .......... 384/477; 384/484; 277/136; 277/178; 277/189
[58] Field of Search .................. 384/477, 484, 384/485, 486, 488; 277/189, 178, 136

[56] References Cited

U.S. PATENT DOCUMENTS

| | | | |
|---|---|---|---|
| 3,813,102 | 5/1974 | Derman | 384/484 X |
| 4,274,298 | 6/1981 | Ostrander | 277/136 X |
| 4,544,168 | 10/1985 | Hans et al. | 277/178 X |
| 4,898,134 | 2/1990 | Breckenfeld et al. | 277/178 X |
| 5,328,276 | 7/1994 | Linteau | 384/477 |
| 5,340,124 | 8/1994 | Jankowski et al. | 277/136 |

*Primary Examiner*—Thomas R. Hannon
*Attorney, Agent, or Firm*—John C. Bigler

[57] ABSTRACT

A pair of axially separated, radially extending annular shoulders form an annular groove on the inside diameter of an outer ring of an antifriction bearing. An adjacent axially extending eccentric surface ensures that of the outer annular shoulder continuously increases around a first arcuate portion and continuously decreases around a second arcuate portion. An annular seal between an inner ring and the outer ring has concentric circumferentially separated protrusions. An annular portion of the annular seal extends into the outer ring annular groove such that when the annular seal rotated, at least one of the protrusions abuts against the eccentric surface to lock the seal against rotation.

4 Claims, 2 Drawing Sheets

ANTIFRICTION BEARING WITH A SEAL LOCKED AGAINST ROTATION

BACKGROUND OF THE INVENTION

This invention relates to antifriction bearings. More particularly, this invention is a new and novel antifriction bearing with a seal, with the seal and the other parts of the bearing constructed so that the seal can be locked against rotation.

Antifriction bearings typically have an inner ring, an outer ring, and rolling members between the rings. The antifriction bearings are lubricated with grease, and in order to retain the grease within the bearing, an annular seal is inserted into the inner ring-outer ring annulus. It is important that the seal be held axially in place and not rotate. It is highly desirable to provide a simplified seal retention and locking assembly which anchors the seal without the use of additional parts. It is also desirable that the bearing require as few parts as possible, and be easily assembled and disassembled.

The foregoing illustrates limitations known to exist in present antifriction bearings. Thus, it is also apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing an antifriction bearing comprising an inner ring, an outer ring, and rolling members around the circumference of the inner ring in rolling contact with inner ring and outer ring raceways. A pair of axially separated, radially extending annular shoulders form an annular groove on the inside diameter of the outer ring. An adjacent axially extending eccentric surface defines a radial dimension of the outer annular shoulder that continuously increases around a first arcuate portion and then continuously decreases around a second arcuate portion. An annular seal in the inner ring-outer ring annulus has concentric circumferentially separated protrusions. An annular portion of the annular seal extends into the outer ring annular groove such that when the annular seal is rotated, at least one of the protrusions abuts against the eccentric surface to lock the seal against rotation.

The forgoing and other aspects will become apparent from the following detailed description of the invention when considered in conjunction with the accompanying drawing figures.

BRIEF DESCRIPTION OF THE DRAWING FIGURES

FIG. 1 is a front elevation view of a preferred embodiment of the invention; and FIG. 2 is a fragmentary sectional view taken along line 2—2 of FIG. 1.

DETAILED DESCRIPTION

Figure 1:
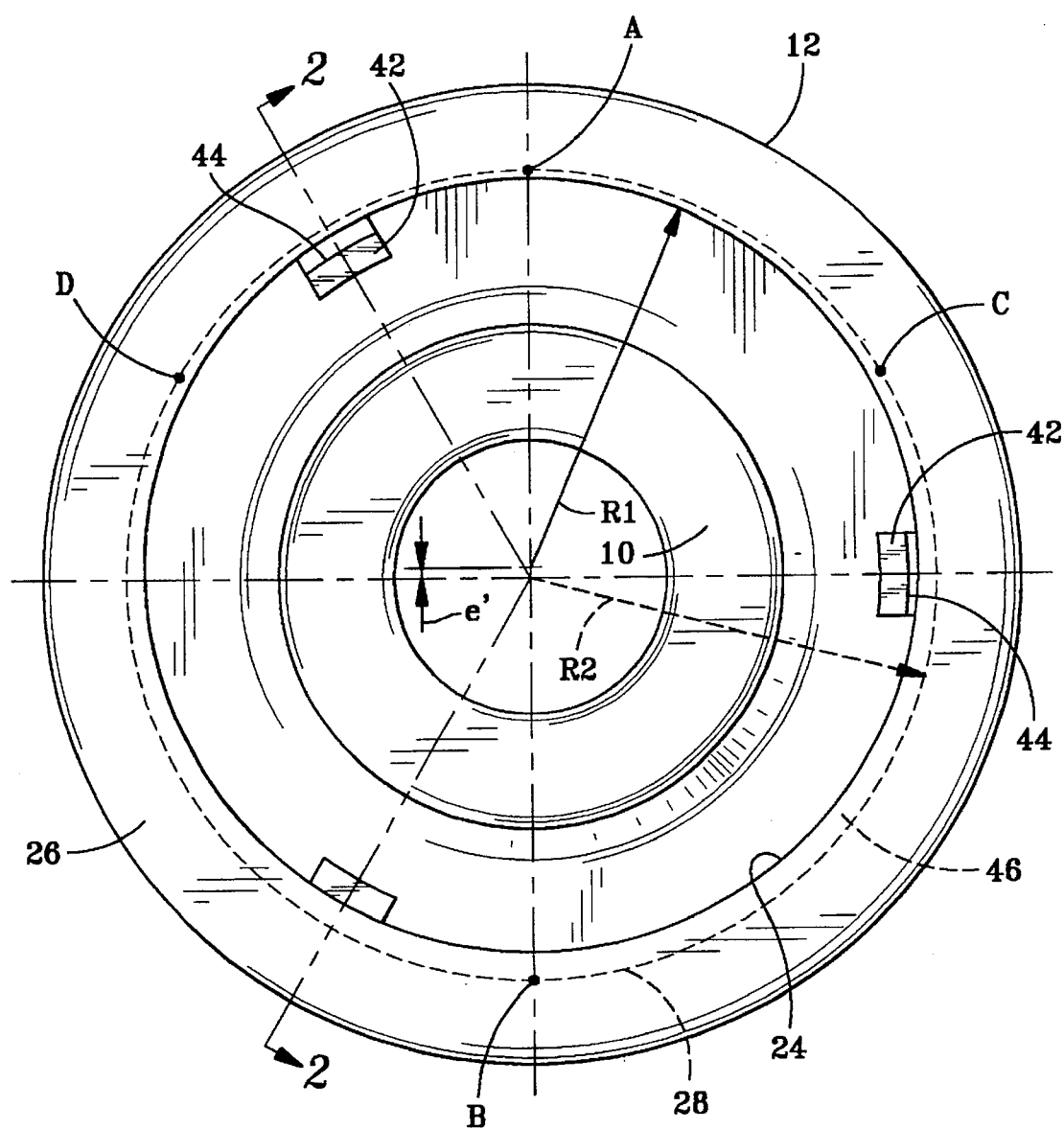
Figure 2:
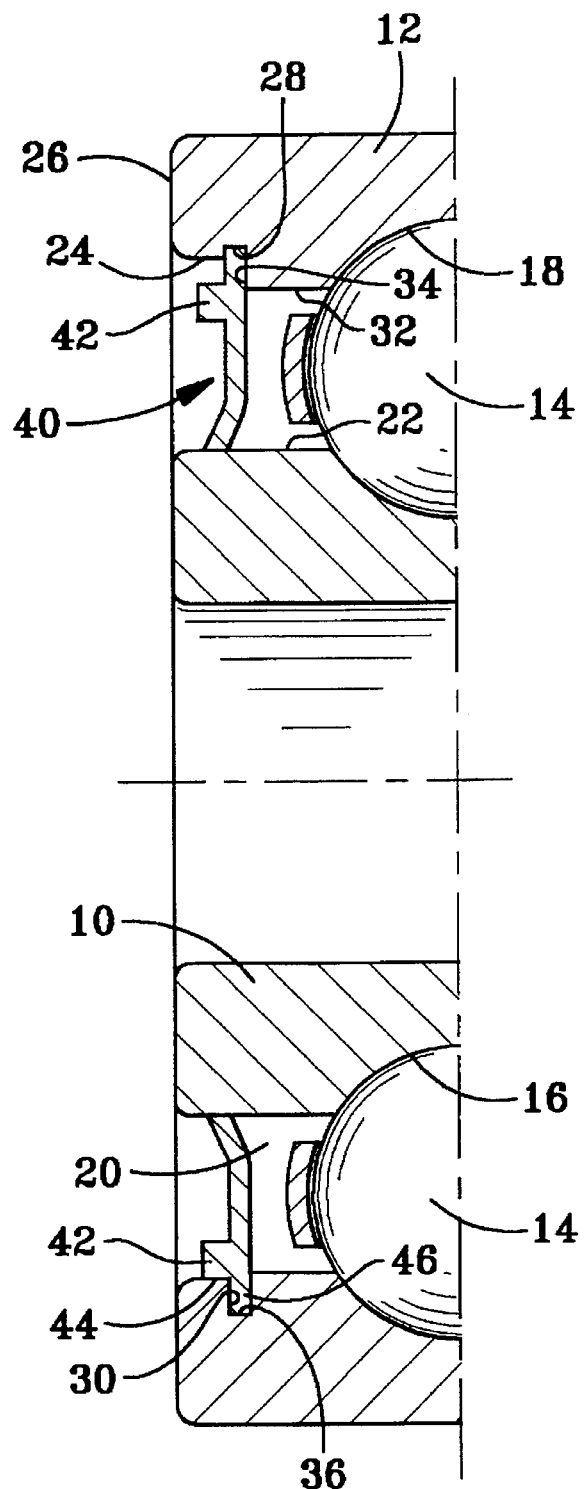

In the various drawing figures, like parts are referred to by like numbers.

Referring to the Figures, the antifriction bearing has an inner ring 10 and an outer ring 12. Rolling members, such as balls 14, are located around the circumference of the inner ring and are in rolling contact with annular raceways 16 and 18 on inner ring 10 and outer ring 12, respectively. The outer ring has an inside diameter greater than the outside diameter of the inner ring thereby providing an inner ring-outer ring annulus 20.

The inner ring 10 outside diameter has an axially extending cylindrical surface 22. The inside diameter of the outer ring 12 has a first cylindrical surface 24 extending axially inwardly from axial end 26, and a second cylindrical surface 28 extending axially inwardly from the first cylindrical surface. The second cylindrical surface has a greater inside diameter than the first cylindrical surface and is radially separated from the first cylindrical surface by a first radially extending shoulder 30. A third cylindrical surface 32 extends axially inwardly from the second cylindrical surface and has a smaller inside diameter than the inside diameter of the first cylindrical surface 24. The third cylindrical surface is radially separated from the second cylindrical surface 28 by a second radially extending annular shoulder 34.

The second and third cylindrical surfaces 28 and 32, respectively, and the cylindrical outside surface 22 of the inner ring 10 are concentric. Since the cylindrical surfaces 28 and 32 are concentric, the radial dimension of the second annular shoulder 34 is constant around its entire circumference.

The outer ring 12 first cylindrical surface 24 is eccentric to the outer ring second cylindrical surface 28 by an amount é and has a radius R1. The second cylindrical surface has a radius R2. Since the first cylindrical surface 24 is eccentric to the second cylindrical surface 28, the radial dimension of the first radially extending annular shoulder 30 continuously increases around the first 180° arc from point A to point B and continuously decreases around the second 180° arc from point B to point A. Thus, the annular groove 36 has a radial dimension, with respect to first cylindrical surface 24, which continuously increases around a first 180° arc from point A to point B and continuously decreases around the second 180° arc from point B to point A.

An annular seal 40, made of a polymer or elastomer, extends radially across the inner ring-outer ring annulus 20. Annular seal 40 has three axially outwardly extending concentric protrusions 42 circumferentially spaced at approximately 120° intervals. A radially outside surface 44 of at least one of the protrusions 42 contacts the outer ring first cylindrical surface 24.

The annular seal 40 has an annular portion 46 extending radially outwardly beyond the protrusions 42. Annular portion 46 has substantially the same axial dimension as the outer ring second cylindrical surface 28. The outer dimension of annular portion 46 is approximately the same as the diameter of the outer ring annular groove. When the annular seal 40 is inserted into the outer ring groove and rotated slightly, the circumferentially separated protrusions 42 will lock against the outer ring first cylindrical surface 24, thereby preventing rotation of the annular seal with respect to the outer ring.

Having described the invention, what is claimed is:

1. An antifriction bearing comprising:
    an inner ring having an inner ring raceway;
    an outer ring having an inside diameter greater than the outside diameter of the inner ring thereby providing an inner ring-outer ring annulus, said outer ring having an outer ring raceway;
    rolling members around the circumference of the inner ring in rolling contact with the inner ring and outer ring raceways;
    the outer ring inside diameter having a pair of axially separated, radially extending annular shoulders forming an annular groove, the radial dimension of the axially outer shoulder being defined by an axially extending eccentric surface such that the axially outer annular shoulder has a radial dimension that continuously increases around a first arcuate portion and then continuously decreases around a second arcuate portion;

an annular seal in the inner ring-outer ring annulus, said annular seal having concentric circumferentially separated protrusions, the annular seal having an annular portion extending into said outer ring annular groove dimensioned so that when the annular seal is inserted into the annular groove and rotated, at least one of the circumferentially separated protrusions abuts against the eccentric surface to lock the seal against rotation.

2. The antifriction bearing according to claim 1 wherein the annular seal is made of a polymer.

3. The antifriction bearing according to claim 1 wherein the number of circumferentially separated protrusions is three.

4. An antifriction bearing comprising:

an inner ring having a cylindrical outside surface and an inner ring raceway;

an outer ring having an inside diameter greater than the outside diameter of the inner ring thereby providing an inner ring-outer ring annulus, said outer ring having an axial end and an outer ring raceway;

rolling members around the circumference of the inner ring in rolling contact with the inner ring and outer ring raceways;

said outer ring having a first cylindrical surface extending axially inwardly from the axial end of the outer ring, a second cylindrical surface extending axially inwardly from the first cylindrical surface and having a greater inside diameter than the first cylindrical surface and radially separated from the first cylindrical surface by a first radially extending annular shoulder, a third cylindrical surface extending axially inwardly from the second cylindrical surface and having a smaller inside diameter than the inside diameter of the first cylindrical surface and radially separated from the second cylindrical surface by a second radially extending annular shoulder, said second cylindrical surface and said third cylindrical surface and the cylindrical outside surface of the inner ring being concentric, said first cylindrical surface being eccentric to the second cylindrical surface so that the first radially extending annular shoulder radial dimension continuously increases around a first 180° arc and continuously decreases around the second 180° arc thereby providing an annular groove having a radial dimension which continuously increases around a first 180° arc and continuously decreases around the second 180° arc; and an annular polymer seal extending radially across the inner ring-outer ring annulus and having three circumferentially spaced axially outwardly extending protrusions, the radially outside surface of at least one of the protrusions contacting the outer ring first cylindrical surface, the annular polymer seal having an annular portion with an axial dimension substantially the same as the axial dimension of the outer ring second cylindrical surface and a radial dimension radially outward of the protusions that is less than the radial dimension of the first radially extending shoulder around a first circumferential portion of the outer ring annular groove and more than the radial dimension of the first radially extending shoulder around a second circumferential portion of the outer ring annular groove so that when the annular polymer seal is inserted into the outer ring annular groove and rotated slightly, the protrusions will be forced against the outer ring first cylindrical surface to lock the annular polymer seal against rotation with respect to the outer ring.

* * * * *